United States Patent
Muraoka

(10) Patent No.: US 10,619,114 B2
(45) Date of Patent: Apr. 14, 2020

(54) PRETREATMENT EQUIPMENT FOR HYDROCARBON GAS TO BE LIQUEFIED AND SHIPPING BASE EQUIPMENT

(71) Applicant: JGC CORPORATION, Yokohama (JP)

(72) Inventor: Tomohide Muraoka, Kanagawa (JP)

(73) Assignee: JGC CORPORATION, Yokohama (JP)

( * ) Notice: Subject to any disclaimer, the term of this patent is extended or adjusted under 35 U.S.C. 154(b) by 95 days.

(21) Appl. No.: 15/740,346

(22) PCT Filed: Aug. 27, 2015

(86) PCT No.: PCT/JP2015/004315
§ 371 (c)(1),
(2) Date: Dec. 28, 2017

(87) PCT Pub. No.: WO2017/033217
PCT Pub. Date: Mar. 2, 2017

(65) Prior Publication Data
US 2018/0187111 A1   Jul. 5, 2018

(51) Int. Cl.
*B01D 53/26* (2006.01)
*C10L 3/10* (2006.01)
(Continued)

(52) U.S. Cl.
CPC .......... *C10L 3/106* (2013.01); *B01D 53/0423* (2013.01); *B01D 53/0454* (2013.01);
(Continued)

(58) Field of Classification Search
CPC .. B01D 53/251; B01D 53/26; B01D 53/0423; B01D 53/0454; B01D 53/0462;
(Continued)

(56) References Cited

U.S. PATENT DOCUMENTS 4,784,672 A * 11/1988 Sircar ............... B01D 53/0462
95/123
5,089,034 A * 2/1992 Markovs ............... B01D 53/04
95/123
(Continued)

FOREIGN PATENT DOCUMENTS

JP   H08-155242   6/1996
JP   H09-188886   7/1997
(Continued)

OTHER PUBLICATIONS

Machine-generated English translation of JP 2006-136885 A, published Jun. 2006.*
Machine-generated English translation of JP 2006-175324 A, published Jul. 2006.*
"International Search Report (Form PCT/ISA/210) of PCT/JP2015/004315", dated Nov. 24, 2015 with English translation thereof, pp. 1-6.

*Primary Examiner* — Frank M Lawrence, Jr.
(74) *Attorney, Agent, or Firm* — JCIPRNET

(57) ABSTRACT

Provided are a liquefaction pretreatment facility for a hydrocarbon gas and the like in which, an influence of contained hydrogen sulfide and oxygen on liquefaction pretreatment can be reduced. In a liquefaction pretreatment facility for a hydrocarbon gas, adsorption vessels are each connected to a treatment gas line configured to supply a hydrocarbon gas containing water, hydrogen sulfide, and oxygen and are each packed with synthetic zeolite for adsorbing and removing water in the hydrocarbon gas. A regeneration gas line is configured to supply a heated regeneration gas to the adsorption vessels to regenerate the synthetic zeolite having adsorbed water through heating. A temperature control system is configured to control a heating temperature of the regeneration gas so that a temperature in the adsorption vessel during regeneration of the synthetic zeolite is less than 230° C., which is a set temperature.

9 Claims, 4 Drawing Sheets

(51) Int. Cl.
  *B01D 53/04* (2006.01)
  *B01D 53/14* (2006.01)
(52) U.S. Cl.
  CPC ..... *B01D 53/0462* (2013.01); *B01D 53/1462* (2013.01); *B01D 53/26* (2013.01); *B01D 53/261* (2013.01); *C10L 3/101* (2013.01); *C10L 3/103* (2013.01); *C10L 3/104* (2013.01); B01D 2252/204 (2013.01); B01D 2253/102 (2013.01); B01D 2253/108 (2013.01); B01D 2253/308 (2013.01); B01D 2256/24 (2013.01); B01D 2256/245 (2013.01); B01D 2257/304 (2013.01); B01D 2257/602 (2013.01); B01D 2257/80 (2013.01); B01D 2259/4009 (2013.01); B01D 2259/40088 (2013.01); C10L 2290/12 (2013.01); C10L 2290/541 (2013.01); C10L 2290/542 (2013.01); C10L 2290/58 (2013.01)

(58) Field of Classification Search
  CPC .......... B01D 53/1462; B01D 2252/204; B01D 2253/102; B01D 2253/108; B01D 2253/308; B01D 2256/24; B01D 2256/245; B01D 2257/304; B01D 2257/602; B01D 2257/80; B01D 2259/40088; B01D 2259/4009; C10L 3/101; C10L 3/103; C10L 3/104; C10L 3/106; C10L 2290/12; C10L 2290/541; C10L 2290/542; C10L 2290/58
  USPC ................. 96/121, 130, 134, 146, 355, 365; 423/228, 229; 585/820, 822, 833
  See application file for complete search history.

(56) References Cited

U.S. PATENT DOCUMENTS

| | | | | |
|---|---|---|---|---|
| 5,803,953 | A | * | 9/1998 | Rojey .............. C10L 3/10 95/105 |
| 5,846,295 | A | * | 12/1998 | Kalbassi ............ B01D 53/0407 95/105 |
| 8,133,302 | B2 | * | 3/2012 | Northrop ............ C10G 70/046 208/208 R |
| 2005/0199123 | A1 | * | 9/2005 | Schmidt ............ B01D 53/0462 95/96 |
| 2011/0094378 | A1 | | 4/2011 | Mitariten |
| 2013/0139526 | A1 | * | 6/2013 | Jariwala ................ F17C 13/082 62/53.2 |
| 2014/0230650 | A1 | * | 8/2014 | Sheu ..................... B01D 53/04 95/119 |
| 2014/0338425 | A1 | * | 11/2014 | Kalbassi ............ B01D 53/047 73/31.07 |

FOREIGN PATENT DOCUMENTS

| | | |
|---|---|---|
| JP | H11-50069 | 2/1999 |
| JP | 2004-154761 | 6/2004 |
| JP | 2006-136885 | 6/2006 |
| JP | 2006-175324 | 7/2006 |
| JP | 2010-174191 | 8/2010 |
| JP | 2015507523 | 3/2015 |
| WO | 2008107709 | 9/2008 |
| WO | 2008146773 | 12/2008 |

\* cited by examiner

PRETREATMENT EQUIPMENT FOR HYDROCARBON GAS TO BE LIQUEFIED AND SHIPPING BASE EQUIPMENT

CROSS-REFERENCE TO RELATED APPLICATION

This application is a 371 application of International PCT application serial no. PCT/JP2015/004315, filed on Aug. 27, 2015. The entirety of the above-mentioned patent application is hereby incorporated by reference herein and made a part of this specification.

TECHNICAL FIELD

The present invention relates to a liquefaction pretreatment facility for pretreatment of a hydrocarbon gas before liquefaction.

BACKGROUND ART

A shipping terminal facility for liquefying and shipping a natural gas which is a hydrocarbon gas produced from a wellhead includes: a liquefaction pretreatment facility for performing pretreatment for removing various impurities from the natural gas before liquefaction; and a liquefaction facility for liquefying the natural gas after the pretreatment to provide a liquefied natural gas (LNG).

In the liquefaction pretreatment facility, for example, in order to prevent natural gas blockage in the liquefaction facility, in which the natural gas is cooled to −150° C. or less, removal of water and carbon dioxide is performed, and in addition, for example, removal of hydrogen sulfide is performed.

As an example of the liquefaction pretreatment facility, in Patent Literature 1, there is disclosed a technology involving bringing a natural gas into contact with an amine absorption liquid to absorb and remove hydrogen sulfide or carbon dioxide, followed by allowing the natural gas to flow through an adsorption vessel packed with synthetic zeolite, which is used as a molecular sieve, to adsorb water and the like. The following regeneration operation is performed on the synthetic zeolite at a predetermined time interval: a temperature of the natural gas after the removal of water is increased to from about 230° C. to about 300° C. and then the natural gas is allowed to flow through the adsorption vessel to desorb the adsorbed water and the like.

Meanwhile, in some cases, the natural gas originally contains oxygen or contains oxygen due to air leak from a transport pipe or various devices. Oxygen in the natural gas may cause corrosion in a pipe device involved in the shipping terminal facility or transport equipment, or cause a reduction in treatment efficiency of various impurities in the liquefaction pretreatment facility.

In this regard, the technology disclosed in Patent Literature 1 does not take into consideration, when a natural gas containing oxygen is treated, its influence on the liquefaction pretreatment facility (see the composition of a natural gas to be treated shown in Table 2).

Herein, in Patent Literature 2, there is disclosed a technology involving allowing a natural gas at an atmospheric temperature before being supplied to the liquefaction pretreatment facility to flow through a packed bed of particles obtained by supporting a metal in a reduced state, such as reduced copper, on carrier particles, to thereby remove oxygen. In addition, in Patent Literature 3, there is disclosed a technology for removing oxygen from a landfill gas (gas containing as a main component a methane gas generated in a landfill) or a low-quality natural gas to be transported as a gas, by membrane separation.

However, the technologies disclosed in Patent Literatures 2 and 3 are each a technology for removing, from a natural gas containing oxygen, the contained oxygen, and there is no disclosure of a liquefaction pretreatment facility supposed to treat the natural gas while containing oxygen.

CITATION LIST

Patent Literature

[Patent literature 1] JP 2010-174191 A: paragraphs 0002, 0027, 0028, 0040, and 0041, and FIG. 6

[Patent literature 2] WO 2008/107709 A1: line 15 on page 8 to line 17 on page 9, and FIG. 1 and FIG. 2

[Patent literature 3] US 2011/0094378 A1: paragraphs 0003, 0029, and 0030, and FIG. 2

SUMMARY OF INVENTION

Technical Problem

The present invention has been made in view of such background, and an object of the present invention is to provide a liquefaction pretreatment facility for a hydrocarbon gas in which, when a hydrocarbon gas containing water, hydrogen sulfide, and oxygen is subjected to liquefaction pretreatment, an influence of the contained hydrogen sulfide and oxygen on the liquefaction pretreatment can be reduced, and to provide a shipping terminal facility including the liquefaction pretreatment facility.

Solution to Problem

According to one embodiment of the present invention, there is provided a liquefaction pretreatment facility for a hydrocarbon gas, including:

an adsorption vessel which is connected to a treatment gas line configured to supply a hydrocarbon gas containing water, hydrogen sulfide, and oxygen and is packed with synthetic zeolite for adsorbing and removing water in the hydrocarbon gas supplied from the treatment gas line;

a regeneration gas line which is configured to supply a preheated regeneration gas to the adsorption vessel so as to regenerate the synthetic zeolite having adsorbed water through heating; and a temperature control system which is configured to control a heating temperature of the regeneration gas so that a temperature in the adsorption vessel during regeneration of the synthetic zeolite is a set temperature that is preliminarily set, in which the set temperature is less than 230° C.

The liquefaction pretreatment facility for a hydrocarbon gas may have the following features.

(a) The synthetic zeolite has an average pore diameter of 3 angstroms or less.

(b) The regeneration gas includes the hydrocarbon gas after removal of water in the adsorption vessel.

(c) The adsorption vessel includes a first adsorption vessel and a second adsorption vessel, and, when the synthetic zeolite in one of the adsorption vessels is regenerated, the hydrocarbon gas is supplied from the treatment gas line to another one of the adsorption vessel to adsorb and remove water in the hydrocarbon gas.

(d) The hydrocarbon gas further contains carbon dioxide, and the liquefaction pretreatment facility further includes: an absorption vessel which is arranged on an upstream side of the adsorption vessel and is configured to absorb carbon dioxide and hydrogen sulfide contained in the hydrocarbon gas by bringing the hydrocarbon gas into contact with an absorption liquid containing an amine compound; and a regeneration vessel which is configured to regenerate the absorption liquid having been brought into contact with the hydrocarbon gas in the absorption vessel by heating the absorption liquid to allow the absorption liquid to emit carbon dioxide and hydrogen sulfide.

(e) The hydrocarbon gas further contains mercury, and the liquefaction pretreatment facility further includes a mercury removal unit which is arranged on an upstream side of the adsorption vessel and is configured to remove mercury contained in the hydrocarbon gas by bringing the hydrocarbon gas into contact with a mercury removal agent in which sulfur is supported on activated carbon.

In addition, according to another embodiment of the present invention, there is provided a shipping terminal facility, including: the above-mentioned liquefaction pretreatment facility for a hydrocarbon gas; and a liquefaction facility configured to liquefy the hydrocarbon gas treated in the liquefaction pretreatment facility.

Advantageous Effects of Invention

In the present invention, temperature control is performed so that the temperature in the adsorption vessel is less than 230° C. while the synthetic zeolite, which is configured to adsorb water contained in the hydrocarbon gas, is regenerated, and hence, for example, generation of water in association with a reaction between oxygen and hydrocarbon is suppressed, with the result that efficient regeneration can be performed.

DESCRIPTION OF EMBODIMENTS

First, the flow of treatment on a natural gas to be performed in a shipping facility terminal 100 for a liquefied natural gas (LNG) is described with reference to FIG. 1.

The natural gas to be handled in the shipping facility terminal 100 of this example contains at least water, hydrogen sulfide, and oxygen, and further carbon dioxide and mercury.

Figure 1:
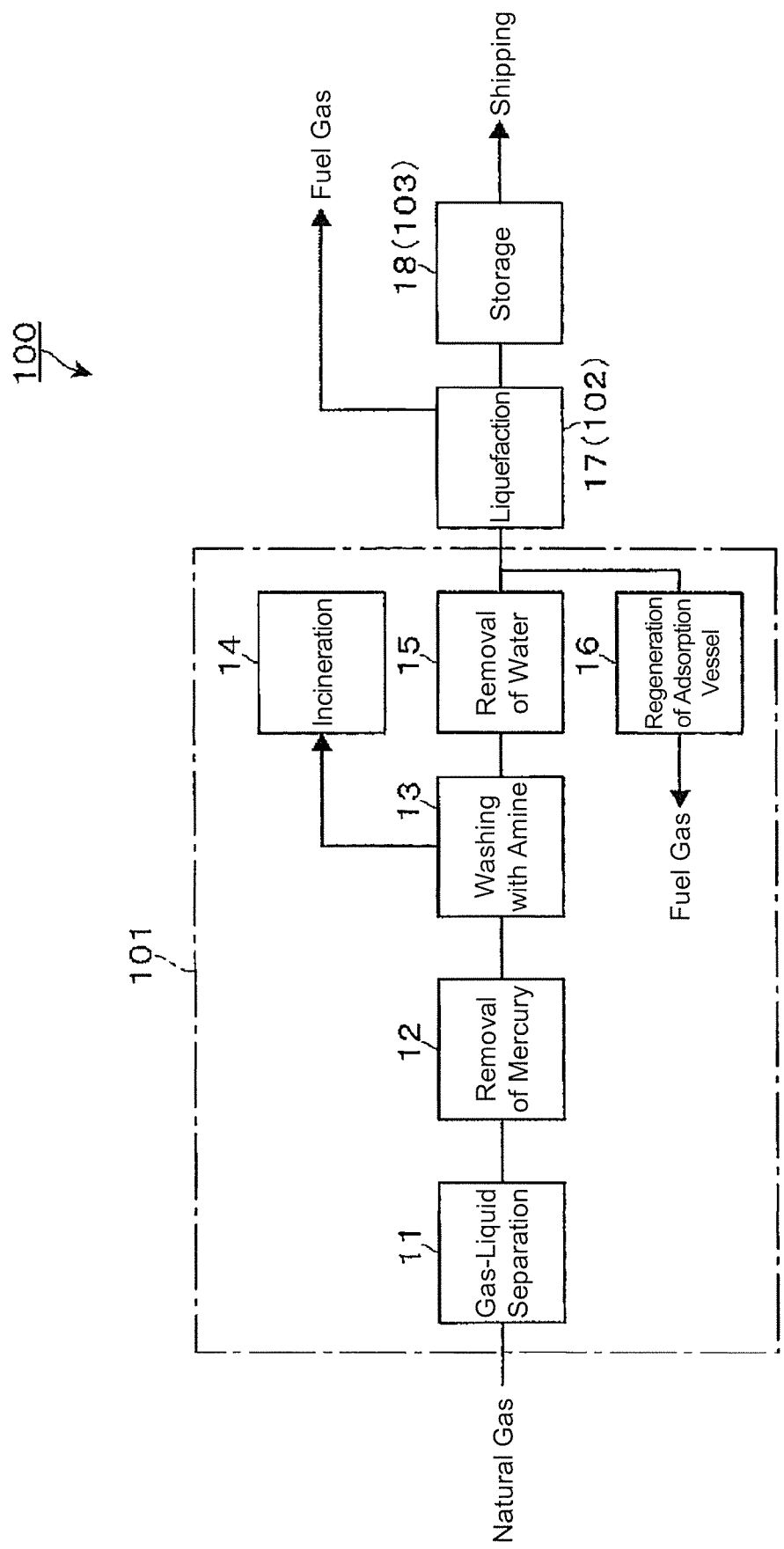
FIG. 1 is a step diagram for illustrating various treatment steps to be performed in a shipping terminal facility for a natural gas.

As illustrated in FIG. 1, a liquid contained in the natural gas is separated in a gas-liquid separation step 11, and then mercury is removed in a mercury removal step 12. Carbon dioxide, hydrogen sulfide, and the like (sometimes referred to collectively as "acid gas") are removed in a subsequent amine washing step 13, and hydrogen sulfide separated from the natural gas is incinerated in an incineration step 14.

Further, water in the natural gas is removed in a water removal step 15. Thus, removal of impurities before liquefaction is completed. As described below, the removal of water in the natural gas is performed, for example, through use of two adsorption vessels 41a, 41b.

The gas-liquid separation step 11, the mercury removal step 12, the amine washing step 13, and the water removal step 15 are performed in a liquefaction pretreatment facility 101.

The natural gas from which the impurities have been removed in the liquefaction pretreatment facility 101 is liquefied in a liquefaction step 17 to provide a liquefied natural gas (LNG). The liquefaction step 17 is performed in a liquefaction facility 102. The liquefaction facility 102 includes, for example: a precooling heat exchanging unit configured to precool the natural gas to, for example, around −40° C. with a precooling refrigerant (containing as a main component propane); a main heat exchanging unit configured to cool the natural gas after precooling to, for example, from −155° C. to −158° C. with a main refrigerant (a mixed refrigerant of methane, ethane, propane, and nitrogen) to liquefy the natural gas; and various compressors configured to compress the precooling refrigerant and the main refrigerant. The detailed description of those components is omitted.

LNG liquefied in the liquefaction facility 102 is subjected to a storage step 18 in a LNG tank 103, and then shipped to a LNG tanker or a pipe line.

In the liquefaction pretreatment facility 101 provided in the above-mentioned shipping facility terminal 100, pretreatment for removing impurities from the natural gas is performed, the natural gas containing at least water, hydrogen sulfide, and oxygen, and further carbon dioxide and mercury as impurities. However, it has been found that, when the natural gas contains about 20 ppm by mole or more of oxygen, oxygen may have various influences on each of the mercury removal step 12, the amine washing step 13, the water removal step 15, and an adsorption vessel regeneration step 16, resulting in a reduction in removal efficiency of the impurities.

In view of the foregoing, the liquefaction pretreatment facility 101 of this example has a configuration capable of removing the impurities while reducing the influences of oxygen contained in the natural gas. Now, the liquefaction pretreatment facility 101 is described in detail with reference to FIG. 2 to FIG. 4.

Figure 2:
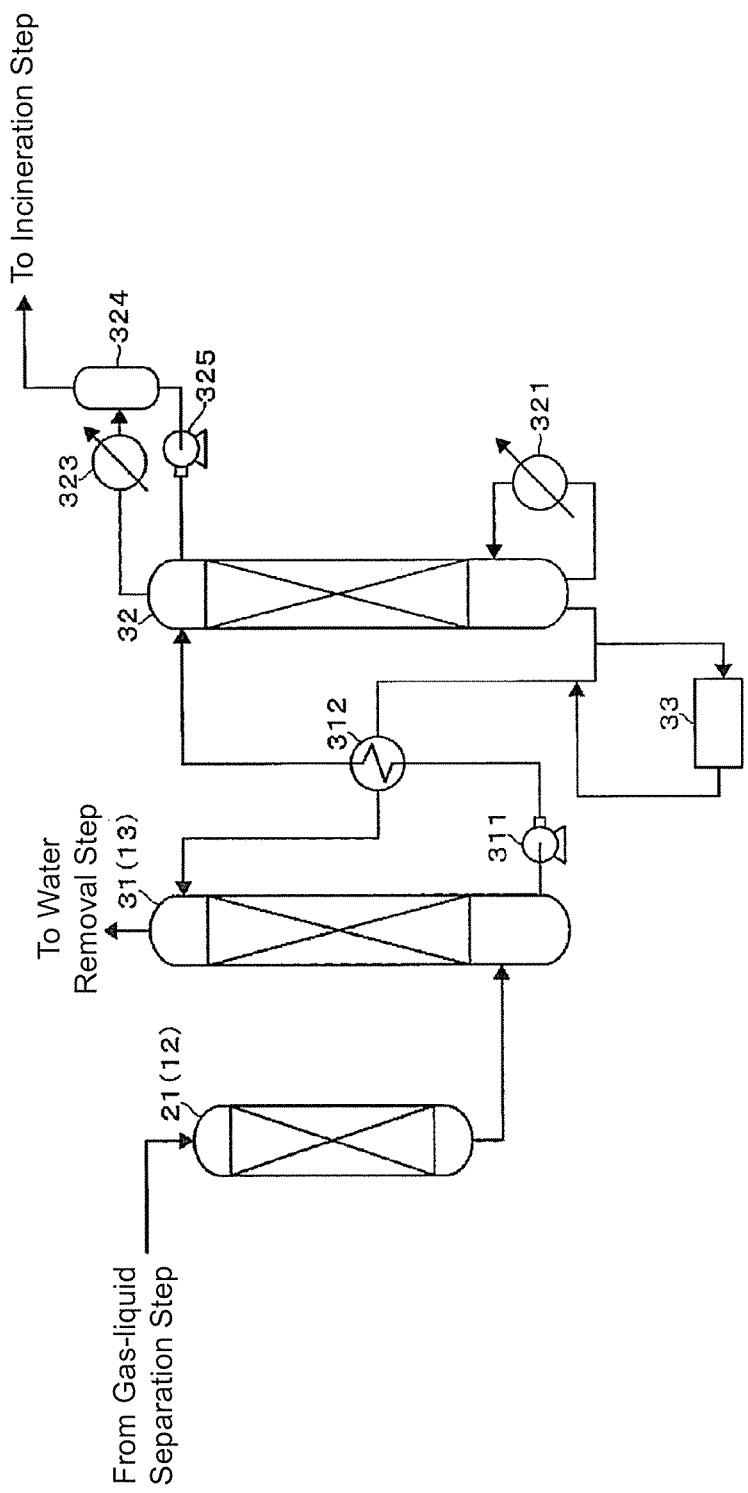
FIG. 2 is a configuration diagram of a mercury removal unit and equipment for washing a natural gas with an amine arranged in a liquefaction pretreatment facility.

In FIG. 2, equipment configuration for performing the mercury removal step 12 and the amine washing step 13 is illustrated.

A mercury removal unit 21 for performing the mercury removal step 12 is arranged in a subsequent stage of a gas-liquid separation drum constituting the gas-liquid separation step 11 not shown in the figures. The mercury removal unit 21 has a configuration in which a mercury removal agent is packed in a packed column, and is configured to adsorb mercury by allowing the natural gas to flow through a packed bed of the mercury removal agent. For example, a natural gas containing about 10 micrograms/$Nm^3$ to about 100 micrograms/$Nm^3$ of mercury is supplied to the mercury removal unit 21, and the content of mercury is reduced to, for example, 5 nanograms/$Nm^3$ or less at an outlet of the mercury removal unit 21.

In general, an activated carbon-based mercury removal agent in which sulfur is supported on activated carbon and a metal-based mercury removal agent in which copper sulfide or zinc sulfide is supported on a carrier have been known as a mercury removal agent for removing mercury in the natural gas. When those mercury removal agents are compared to each other, it has been found that, from the viewpoint of treating the natural gas containing oxygen, the activated carbon-based mercury removal agent is less liable to be reduced in its removal capability under the presence of oxygen than the metal-based mercury removal agent.

In view of the foregoing, in the mercury removal unit 21 of this example, mercury is removed through use of the activated carbon-based mercury removal agent in which sulfur is supported.

Meanwhile, it has also been found that, when the natural gas containing oxygen is treated with the activated carbon-based mercury removal agent as described above, oxygen may react with sulfur or hydrocarbon to generate a by-product, such as a sulfur compound (for example, hydrogen sulfide or the like), or water.

In a general liquefaction pretreatment facility for a natural gas without consideration of the incorporation of oxygen, the mercury removal step 12 may be sometimes arranged between the water removal step 15 and the liquefaction step 17, instead of between the gas-liquid separation step 11 and the amine washing step 13.

In the liquefaction pretreatment of the natural gas containing oxygen, however, when the mercury removal step 12 is arranged immediately before the liquefaction step 17, the by-product, such as a sulfur compound, or water is supplied downstream, resulting in occurrence of blockage in a device in the liquefaction facility 102 or the like or an increase in concentration of the sulfur compound in LNG as a product.

For those reasons, when the natural gas containing oxygen is treated through use of the activated carbon-based mercury removal agent, it is necessary to arrange the mercury removal step 12 upstream of the amine washing step 13, in which the sulfur compound can be removed, and of the water removal step 15, in which water is removed.

As further illustrated in FIG. 2, an absorption vessel 31 for performing the amine washing step 13 is arranged in a subsequent stage of the mercury removal unit 21. In the absorption vessel 31, an absorption liquid containing an amine compound is dispersed and supplied in a state of, for example, liquid droplets from a column top side, whereas the natural gas after the removal of mercury is supplied from a column bottom side. As a result, the absorption liquid and the natural gas are brought into convection contact with each other in the absorption vessel 31, and thus carbon dioxide, which is an acid gas having a risk of being solidified in LNG at the time of liquefaction, is absorbed from the natural gas into the absorption liquid, and removed therefrom.

At this time, hydrogen sulfide and the above-mentioned sulfur compound generated in the mercury removal step 12 are also absorbed and removed by selecting an absorption liquid (for example, methyldiethanolamine (MDEA)) capable of absorbing these acid gases in addition to carbon dioxide and adjusting a liquid load (the amount of the absorption liquid to be supplied to the absorption vessel 31 per unit time) and the number of absorption vessels. As a result, an influence of hydrogen sulfide on equipment for performing the water removal step 15 and the liquefaction step 17 in subsequent stages, and as well, the concentration of the sulfur compound in LNG as a product are reduced.

The absorption liquid which has absorbed carbon dioxide, hydrogen sulfide, and the like in the absorption vessel 31 is transferred to a regeneration vessel 32 with a liquid feed pump 311. In the regeneration vessel 32, the absorption liquid which has absorbed the acid gas is dispersed and supplied in a state of, for example, liquid droplets from a column top side. Meanwhile, the absorption liquid in the column is heated with a reboiler 321 arranged on a column bottom side. Thus, the acid gas absorbed into the absorption liquid is emitted.

The acid gas (carbon dioxide, hydrogen sulfide, and the sulfur compound) emitted from the absorption liquid is cooled with a cooler 323, subjected to gas-liquid separation in a separation drum 324, and then transferred to the incineration step 14. The acid gas after incineration of hydrogen sulfide and the sulfur compound in the incineration step 14 is discharged to the atmosphere after being subjected to necessary exhaust gas treatment.

In addition, part of the absorption liquid discharged from a column top of the regeneration vessel 32 in a steam state is cooled with the cooler 323 to be condensed, subjected to gas-liquid separation in the separation drum 324 to be separated from the acid gas, and then returned to the regeneration vessel 32 with a circulation drum 325.

The absorption liquid regenerated in the regeneration vessel 32 is extracted from a column bottom of the regeneration vessel 32, and returned to the absorption vessel 31. At this time, as illustrated in FIG. 2, the absorption liquid may be preheated before being supplied to the regeneration vessel 32 through heat exchange between the absorption liquid extracted from the absorption vessel 31 and the absorption liquid extracted from the regeneration vessel 32 through use of a heat exchanger 312.

Through use of the absorption vessel 31 described above, the natural gas, which contains, for example, about 0.5 mol % to about 5 mol % of carbon dioxide and about 1 mol % to about 5 mol % of hydrogen sulfide or the sulfur compound at an inlet of the absorption vessel 31, is reduced in carbon dioxide content to, for example, 50 ppm by mole or less and in hydrogen sulfide or sulfur compound content to, for example, 3 ppm by mole or less at an outlet of the absorption vessel 31.

Herein, from the viewpoint of pretreatment of the natural gas containing oxygen, selection of the absorption liquid and adjustment of the operation conditions of the absorption vessel 31 and the regeneration vessel 32 are performed so that even the sulfur compound to be generated in the mercury removal step 12 is removed in addition to carbon dioxide and hydrogen sulfide preliminarily contained in the natural gas. As described below, particularly when the water removal step 15 is performed on the natural gas containing oxygen, the presence of hydrogen sulfide or other sulfur compounds in the natural gas may be a factor in inhibiting water removal performance in the water removal step 15. At this time, influences of those substances on the water removal step 15 can be reduced when the amine washing step 13 is performed even in consideration of the sulfur compound to be generated in the liquefaction pretreatment facility 101.

Further, in the amine washing step 13, in which absorption of carbon dioxide, hydrogen sulfide, and the like in the absorption vessel 31 and regeneration of the absorption liquid in the regeneration vessel 32 are repeated, a heat stable salt is liable to be generated through a reaction between oxygen contained in the natural gas and the absorption liquid, and there is a risk in that the absorption liquid may be degraded acceleratedly as compared to in treatment of a natural gas without oxygen. In view of the foregoing, a reclaimer 33 configured to extract part of the absorption liquid, which circulates between the absorption vessel 31 and the regeneration vessel 32, and remove the heat stable salt contained in the absorption liquid may be arranged. The mode of the reclaimer 33 is not particularly limited, but examples thereof may include: a method involving neutralizing the absorption liquid to decompose the heat stable salt; and a method involving removing various ions responsible for the formation of the heat stable salt through use of an ion exchange resin.

Figure 3:
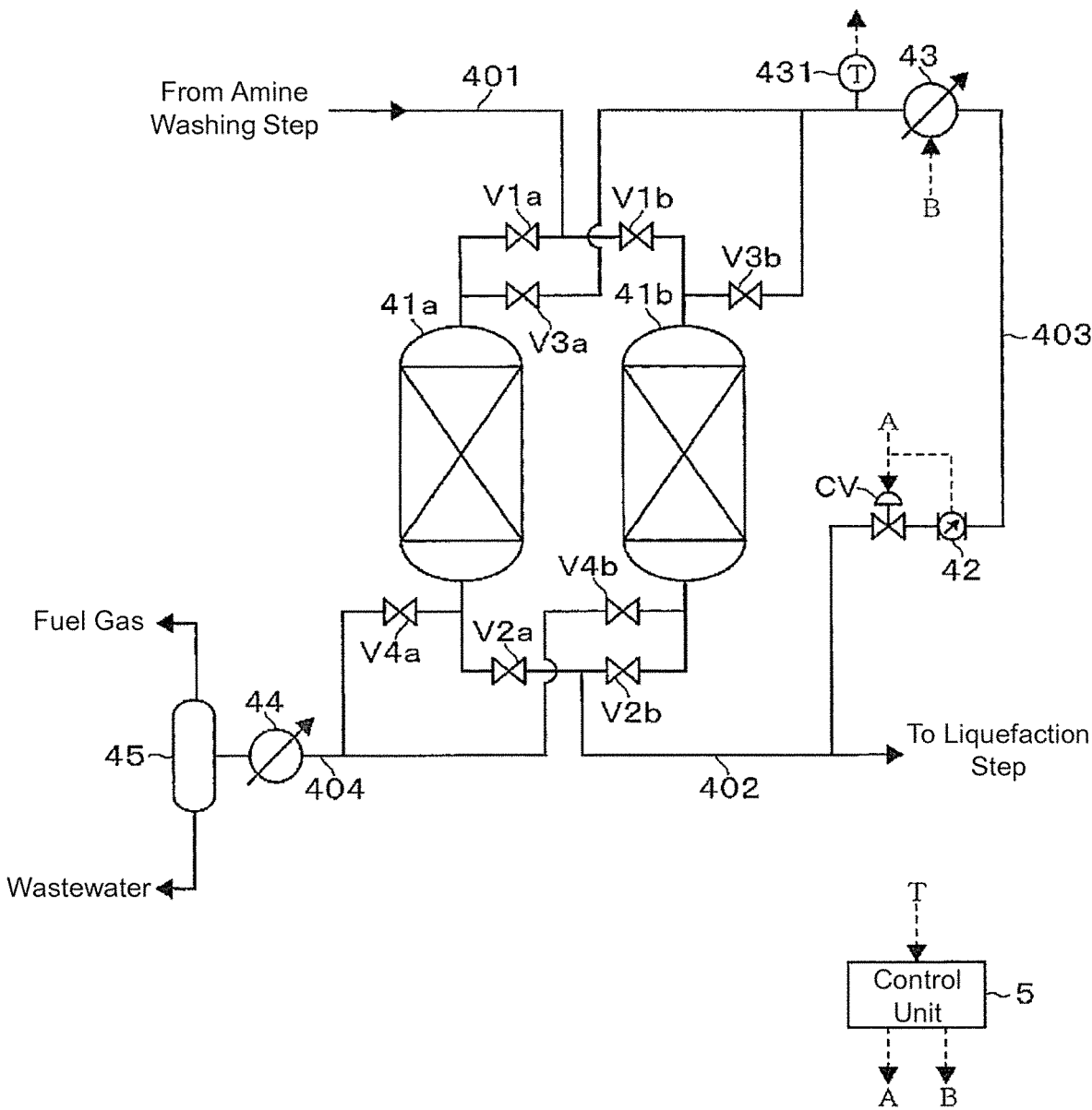
FIG. 3 is a configuration diagram of an adsorption vessel arranged in the liquefaction pretreatment facility and configured to remove water in the natural gas.

In FIG. 3, equipment configuration for performing the water removal step 15 is illustrated. The natural gas from which the acid gas has been removed in the amine washing step 13 is supplied to the adsorption vessels 41a, 41b each configured to adsorb and remove water. The adsorption vessels 41a, 41b are each packed with synthetic zeolite serving as a molecular sieve. In the example illustrated in FIG. 3, the first adsorption vessel 41a and the second adsorption vessel 41b are used, and when the water removal step 15 is performed in one of the adsorption vessels, 41a or 41b, the adsorption vessel regeneration step 16 is performed in the other adsorption vessel, 41b or 41a.

As illustrated in FIG. 3, a supply line 401 for a natural gas (treatment gas line) from the amine washing step 13 is branched to be connected to the respective inlets of the adsorption vessels 41a, 41b. Further, a regeneration gas line 403 for supplying a regeneration gas for regenerating the synthetic zeolite having adsorbed water through heating is connected to those inlets. In this example, the dried natural gas after the removal of water in the adsorption vessels 41a, 41b is used as the regeneration gas.

Open/close valves V1a, V1b are arranged in the branched supply lines 401 connected to the respective adsorption vessels 41a, 41b. Meanwhile, similarly, open/close valves V3a, V3b are arranged in the branched regeneration gas lines 403 connected to the respective adsorption vessels 41a, 41b. With such configuration, in each of the adsorption vessels 41a, 41b, a pipe line connected to the inlet of the adsorption vessel can switch between the supply line 401 and the regeneration gas line 403.

Meanwhile, a delivery line 402 for the dried natural gas is connected to the respective outlets of the adsorption vessels 41a, 41b. Those delivery lines 402 are joined together on a downstream side and then connected to the liquefaction facility 102 for performing the liquefaction step 17.

Further, the already-described regeneration gas line 403 for supplying, as the regeneration gas, the dried natural gas to the respective inlets of the adsorption vessels 41a, 41b is branched from the delivery line 402 on a downstream side of the joined portion.

In the regeneration gas line 403, which is branched from the delivery line 402, a flow control valve CV, and a heating unit 43 configured to heat the regeneration gas (dried natural gas), such as a heat exchanger, are arranged. The heating unit 43 may be, for example, a heating furnace. The flow control valve CV is configured to perform flow control so that the flow rate of the regeneration gas to be supplied to the adsorption vessels 41a, 41b is a preliminarily set value based on a value of flow rate detected with a flow meter 42 arranged on a downstream side of the flow control valve CV. In addition, the heating unit 43 is configured to perform temperature control so that the temperature of the regeneration gas to be supplied to the adsorption vessels 41a, 41b is a preliminarily set value based on a value of temperature detected with a thermometer 431 arranged on a downstream side of the heating unit 43. Those flow rate set value and temperature set value are set by a control unit 5, which is a control computer placed in a control room or the like in the shipping facility terminal 100.

In addition to those components, an exhaust gas line 404 for discharging the regeneration gas after regeneration of the synthetic zeolite (exhaust gas) is connected to the respective outlets of the adsorption vessels 41a, 41b. Those exhaust gas lines 404 are joined together on a downstream side and then connected to a separation drum 45 configured to separate condensed water or the like and the exhaust gas from each other after passing through a cooler 44 for cooling the exhaust gas. Water separated from the exhaust gas in the separation drum 45 is discharged to the outside after being subjected to necessary wastewater treatment. Meanwhile, the exhaust gas from which free water has been removed (natural gas) is utilized as a fuel gas in the shipping facility terminal 100.

Open/close valves V2a, V2b are arranged in the delivery lines 402 connected to the respective adsorption vessels 41a, 41b. Meanwhile, similarly, open/close valves V4a, V4b are arranged in the exhaust gas lines 404 connected to the respective adsorption vessels 41a, 41b. With such configuration, in each of the adsorption vessels 41a, 41b, a pipe line connected to the outlet of the adsorption vessel can switch between the delivery line 402 and the exhaust gas line 404.

The adsorption vessels 41a, 41b having the above-mentioned configurations have the following features from the viewpoint of treating the natural gas containing oxygen.

As has already been described, in the adsorption vessels 41a, 41b, each of which is packed with synthetic zeolite serving as a molecular sieve for water adsorption, when adsorption capability is reduced along with an increase in adsorption amount of water, the adsorption vessel regeneration step 16 is performed. The adsorption vessel regeneration step 16 involves an operation of bringing the synthetic zeolite into contact with the regeneration gas, which is preheated and has a low content of water (in this example, dried natural gas), to allow water to be discharged from the synthetic zeolite to the regeneration gas.

Now, attention is focused on the average pore diameter of the synthetic zeolite. Synthetic zeolite having an average pore diameter of 4 angstroms or less is suitable for adsorption and removal of water. In addition, as the average pore diameter of the synthetic zeolite becomes larger, the amount of water to be adsorbed on and removed by the synthetic zeolite per unit volume increases more. However, a temperature (regeneration temperature) in the adsorption vessels 41a, 41b tends to be increased. For example, it is known that a regeneration temperature of about 290° C. is required for synthetic zeolite having an average pore diameter of 4 angstroms.

Meanwhile, when the regeneration temperature is increased up to about 290° C., an oxidation reaction proceeds between hydrocarbon and oxygen in the natural gas, resulting in generation of water in the regeneration gas. When the concentration of water is increased in the regeneration gas, there is a risk in that water may not be sufficiently discharged from the synthetic zeolite to the regeneration gas, and an influence may be exerted on the regeneration of the synthetic zeolite (an increase in regeneration time and an increase in residual amount of water in the synthetic zeolite after regeneration).

In addition, under high temperature of about 290° C., there is also a risk in that a tiny amount of hydrogen sulfide in the natural gas, which is left unremoved in the amine washing step 13, may react with oxygen to form a solid such as sulfur or a sulfide and thus block fine pores in the synthetic zeolite, resulting in a reduction in water adsorption capability. Particularly when the temperature in the adsorption vessels 41a, 41b is further increased owing to reaction heat during the reaction between hydrocarbon and oxygen, the blockage of the fine pores caused by the solid is more liable to occur.

In view of the foregoing, in the adsorption vessels 41a, 41b of this example, synthetic zeolite having an average pore diameter of 3 angstroms or less (for example, 3 angstroms) is used, and the adsorption vessel regeneration step 16 is performed at a regeneration temperature of less than 230° C.

As already described, even in the synthetic zeolite having an average pore diameter of 3 angstroms or less, a larger amount of adsorbed water can be discharged as the regeneration temperature becomes higher. However, when the regeneration temperature is 230° C. or more, the amount of water to be generated in association with the oxidation reaction between hydrocarbon and oxygen in the natural gas is increased, and a greater influence is exerted on the adsorption vessel regeneration step 16.

Meanwhile, when the regeneration temperature is reduced to, for example, 200° C., the oxidation reaction hardly proceeds, and an influence caused by the generation of water is not observed. However, as the regeneration temperature is reduced more, there is a risk in that the discharge amount of adsorbed water may be reduced more, with the result that the regeneration of the synthetic zeolite cannot proceed sufficiently.

From the above-mentioned viewpoints, it can be said that an optimum regeneration temperature of the adsorption vessels 41a, 41b in the adsorption vessel regeneration step 16 falls within a range of from 200° C. to 230° C. In actuality, the optimum regeneration temperature more preferably falls within a range of from 205° C. to 225° C. while the optimum regeneration temperature varies depending on the composition of the natural gas and the content of water or oxygen.

The heating unit 43 serving as a temperature control system is configured to control the temperature of the regeneration gas to be supplied to the adsorption vessels 41a, 41b so that the regeneration temperature (temperature in the adsorption vessels 41a, 41b) is a predetermined set temperature (less than 230° C.) set by the control unit 5 based on a value of temperature detected with the heating unit 43 on an outlet side of the heating unit 43.

Figure 4:
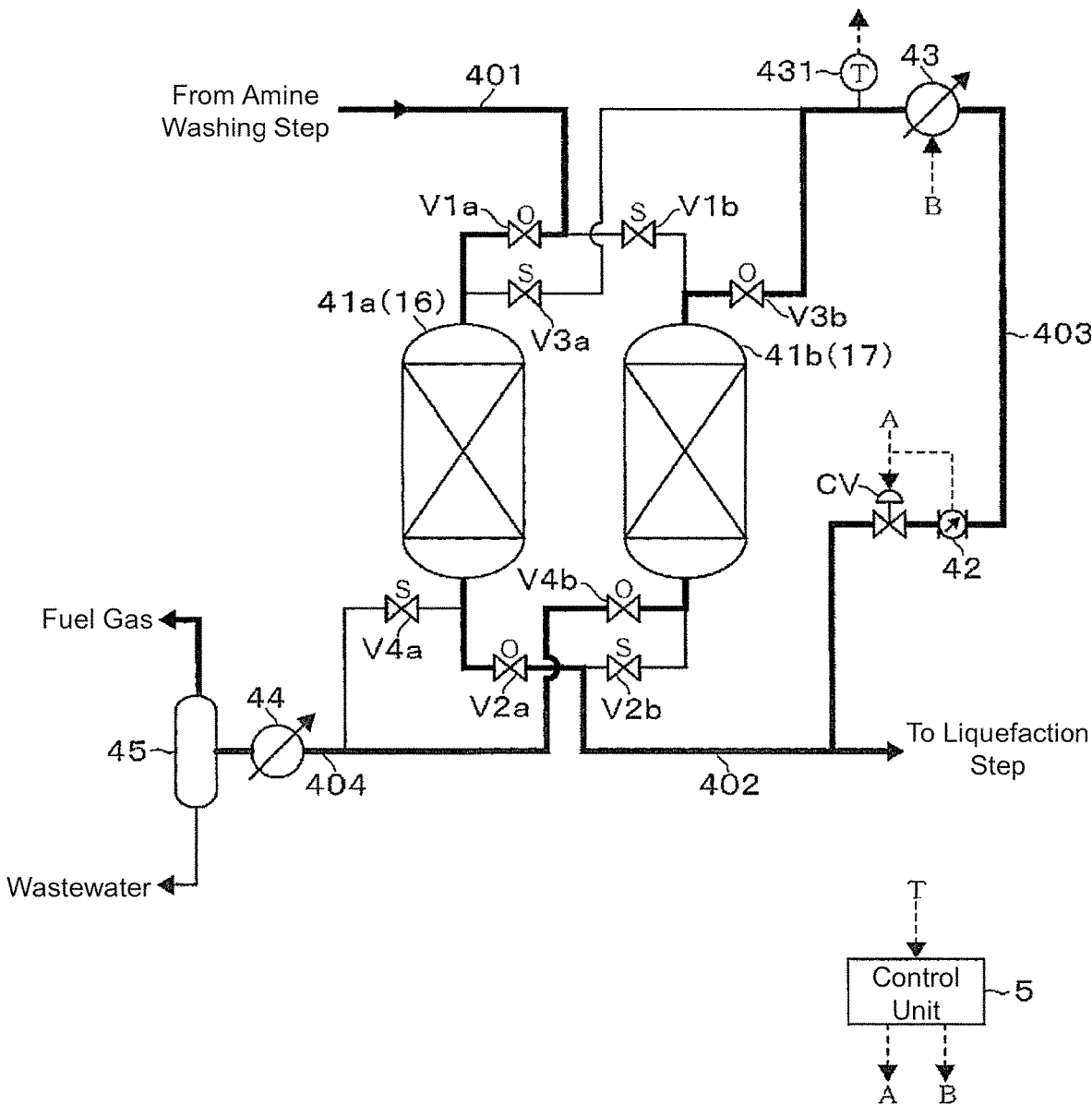
FIG. 4 is an explanatory diagram of an action of the adsorption vessel.

Now, with reference to FIG. 4, description is given of an example of an operation of performing the water removal step 15 in one of the two adsorption vessels 41a, 41b (first adsorption vessel 41a) while performing the adsorption vessel regeneration step 16 in the other one (second adsorption vessel 41b).

As illustrated in FIG. 4, on an inlet side of the first adsorption vessel 41a for preforming the water removal step 15, the open/close valve V1a is opened (represented as "O" in FIG. 4; the same applies hereinafter) to connect the adsorption vessel 41a to the supply line 401 for a natural gas, whereas the open/close valve V3a is shut (represented as "S" in FIG. 4; the same applies hereinafter) to disconnect the adsorption vessel 41a from the regeneration gas line 403. In addition, on an outlet side of the first adsorption vessel 41a, the open/close valve V2a is opened to connect the adsorption vessel 41a to the delivery line 402, whereas the open/close valve V4a is shut to disconnect the adsorption vessel 41a from the exhaust gas line 404.

In contrast, on an inlet side of the second adsorption vessel 41b for performing the adsorption vessel regeneration step 16, the open/close valve V1b is shut to disconnect the adsorption vessel 41b from the supply line 401, whereas the open/close valve V3b is opened to connect the adsorption vessel 41b to the regeneration gas line 403. In addition, on an outlet side of the second adsorption vessel 41b, the open/close valve V2b is closed to disconnect the adsorption vessel 41b from the delivery line 402, whereas the open/close valve V4b is opened to connect the adsorption vessel 41b to the exhaust gas line 404.

With the above-mentioned valve set, the natural gas treated in the amine washing step 13 is introduced to a first adsorption vessel 41a side. Thus, the natural gas is brought into contact with the synthetic zeolite and water is removed therefrom.

The concentration of water in the natural gas at the inlets of the adsorption vessels 41a, 41b is generally in a saturated state, and the content of water is reduced to, for example, 1 ppm by mole or less in the water removal step 15. The temperature in the adsorption vessels 41a, 41b in the water removal step 15 is determined depending on the temperature of the natural gas to be treated or heat to be generated during adsorption of water on the synthetic zeolite.

The natural gas from which water has been removed is allowed to flow through the outlet of the first adsorption vessel 41a into the delivery line 402 to be delivered to the liquefaction step 17.

Part of the natural gas from which water has been removed in the first adsorption vessel 41a (dried natural gas) is allowed to flow in a branched manner into the regeneration gas line 403 and used in the adsorption vessel regeneration step 16 for the second adsorption vessel.

The regeneration gas is subjected to temperature control through heating with the heating unit 43 so that the second adsorption vessel 41b has a predetermined regeneration temperature of less than 230° C., followed by being supplied to the second adsorption vessel 41b.

The temperature control of the regeneration gas is performed by increasing or reducing the supply amount of a heating medium, such as steam, to be supplied to the heating unit 43.

Herein, the discharge of water from the synthetic zeolite is an endothermic reaction. However, the amount of adsorbed water is relatively small as compared to the heat capacities of the synthetic zeolite and the regeneration gas in the adsorption vessels 41a, 41b, and hence an endothermic amount caused by the endothermic reaction is small. Therefore, when a sufficient time elapses after the regeneration gas heated with the heating unit 43 starts to be supplied to the adsorption vessels 41a, 41b in the adsorption vessel regeneration step 16, it is convenient to consider that the temperature in the adsorption vessels 41a, 41b is nearly equal to the temperature of the regeneration gas at an outlet of the heating unit 43. In view of the foregoing, in this example, the regeneration temperature is controlled based on a detection result of an outlet temperature of the heating unit 43. It goes without saying that the regeneration temperature may be controlled based on a value detected with a thermometer installed in the adsorption vessels 41a, 41b.

In the second adsorption vessel 41b, the adsorption vessel regeneration step 16 is performed by allowing water to be discharged from the synthetic zeolite through supply of the regeneration gas. At this time, the regeneration temperature is suppressed to less than 230° C., and hence the generation of water in association with the oxidation reaction between hydrocarbon and oxygen in the natural gas is suppressed, and also the influence on the adsorption vessel regeneration step 16 is reduced.

In addition, also an increase in temperature in the second adsorption vessel 41b in association with proceeding of the oxidation reaction is prevented by virtue of the regeneration temperature suppressed to less than 230° C. As a result, such a trouble that a tiny amount of hydrogen sulfide in the natural gas reacts with oxygen to form a solid such as sulfur or a sulfide and thus block fine pores in the synthetic zeolite, resulting in a reduction in water adsorption capability is less liable to arise.

The regeneration gas which has passed through the second adsorption vessel 41b and contains water discharged from the synthetic zeolite is discharged from the outlet into the exhaust gas line 404, cooled with the cooler 44 to allow water or the like to be condensed, and then subjected to gas-liquid separation in the separation drum 45.

When the above-mentioned adsorption vessel regeneration step 16 is performed for a preliminarily set time and the regeneration of the synthetic zeolite is completed in the second adsorption vessel 41b, the heating unit 43 is stopped or the regeneration gas is allowed to flow through a bypass flow passage (not shown) for the heating unit 43 to allow a low temperature gas to flow, to thereby reduce the temperature in the second adsorption vessel 41b. After the temperature is reduced, the open/close valve V3b is shut to disconnect the second adsorption vessel 41b from the regeneration gas line 403.

Then, at a timing for the regeneration of the synthetic zeolite on the first adsorption vessel 41a side, a second adsorption vessel 41a side is disconnected from the exhaust gas line 404 and concurrently connected to the supply line 401 and the delivery line 402. Thus, a state in which the water removal step 15 is performed in parallel in the first and second adsorption vessels 41a, 41b is achieved. Next, the first adsorption vessel 41a is disconnected from the supply line 401 and the delivery line 402, and then connected to the regeneration gas line 403 and the exhaust gas line 404. The regeneration gas starts to be supplied, and the adsorption vessel regeneration step 16 is performed.

The liquefaction pretreatment facility 101 according to this embodiment has the following effect: temperature control is performed so that the temperature in the adsorption vessels 41a, 41b is less than 230° C. while the synthetic zeolite, which is configured to adsorb water contained in the natural gas (hydrocarbon gas), is regenerated, and hence, for example, the generation of water in association with the reaction between oxygen and hydrocarbon is suppressed, with the result that efficient regeneration can be performed.

In addition to this, as listed below, various measures are adopted in the mercury removal step 12 and the amine washing step 13 in consideration of treating the natural gas containing oxygen.
(i) Selection of the activated carbon-based mercury adsorbing agent in the mercury removal unit 12
(ii) Selection of the arrangement position of the mercury removal unit 12 in consideration of outflow of the sulfur compound from the mercury adsorbing agent
(iii) Removal of the acid gas in the absorption vessel 31 even in consideration of removal of the sulfur compound generated in the mercury removal unit 12
(iv) Arrangement of the reclaimer 33 in the regeneration vessel 32 in consideration of an influence of oxygen on the absorption liquid As a result, the natural gas containing oxygen can be subjected to liquefaction pretreatment without taking such a large-scale countermeasure as providing an oxygen removal facility for removing oxygen contained in the natural gas on an inlet side of the liquefaction pretreatment facility 101. The present invention is effective particularly for pretreatment of a natural gas containing about 20 ppm by mole or more of oxygen.

Herein, the incorporation of the mercury removal step 12 and the amine washing step 13 in the liquefaction pretreatment facility 101 is not an essential requirement, and any one or both of the steps 12 and 13 may be omitted depending on the contents of mercury, carbon dioxide, hydrogen sulfide, and the like in the natural gas.

Further, the number of the adsorption vessels 41a, 41b is not limited to two illustrated in FIG. 3 and FIG. 4, and three or more adsorption vessels may be arranged. In this case, for example, it is appropriate to consider an adsorption vessel in which the water removal step 15 is performed as the first adsorption vessel and consider another adsorption vessel in which the adsorption vessel regeneration step 16 is performed or which is waiting as the second adsorption vessel.

The invention claimed is:

1. A method of using a liquefaction pretreatment facility for a hydrocarbon gas, wherein the liquefaction pretreatment facility comprises:
    an adsorption vessel which is connected to a treatment gas line, the adsorption vessel is packed with synthetic zeolite;
    a regeneration gas line connected to the adsorption vessel; and
    a temperature control system configured to control a heating temperature of a regeneration gas in the regeneration gas line;
    and wherein the method comprises:
    supplying a hydrocarbon gas containing water, hydrogen sulfide, and oxygen from the treatment gas line to the adsorption vessel, and adsorbing and removing water in the hydrocarbon gas supplied from the treatment gas line using the synthetic zeolite in the adsorption vessel;
    supplying a preheated regeneration gas from the regeneration gas line to the adsorption vessel so as to regenerate the synthetic zeolite having adsorbed water through heating; and
    controlling a heating temperature of the regeneration gas using the temperature control system so that a temperature in the adsorption vessel during regeneration of the synthetic zeolite is a set temperature that is preliminarily set,
    wherein the set temperature is in a range from 200° C. to 230° C.

2. The method of using a liquefaction pretreatment facility for a hydrocarbon gas according to claim 1, wherein the synthetic zeolite has an average pore diameter of 3 angstroms or less.

3. The method of using a liquefaction pretreatment facility for a hydrocarbon gas according to claim 1, wherein the regeneration gas comprises the hydrocarbon gas after removal of water in the adsorption vessel.

4. The method of using a liquefaction pretreatment facility for a hydrocarbon gas according to claim 1,
    wherein the adsorption vessel comprises a first adsorption vessel and a second adsorption vessel, and the method further comprises:
    supplying the hydrocarbon gas from the treatment gas line to another one of the adsorption vessel to adsorb and remove water in the hydrocarbon gas when the synthetic zeolite in one of the adsorption vessels is regenerated.

5. The method of using a liquefaction pretreatment facility for a hydrocarbon gas according to claim 1,
    wherein the hydrocarbon gas further contains carbon dioxide, and
    wherein the liquefaction pretreatment facility further comprises:
    an absorption vessel which is arranged on an upstream side of the adsorption vessel; and
    a regeneration vessel; and wherein the method further comprises:
using the absorption vessel to absorb carbon dioxide and hydrogen sulfide contained in the hydrocarbon gas by bringing the hydrocarbon gas into contact with an absorption liquid containing an amine compound; and using the regeneration vessel to regenerate the absorption liquid having been brought into contact with the hydrocarbon gas in the absorption vessel by heating the absorption liquid to allow the absorption liquid to emit carbon dioxide and hydrogen sulfide.

6. The method of using a liquefaction pretreatment facility for a hydrocarbon gas according to claim 1,
wherein the hydrocarbon gas further contains mercury, and
wherein the liquefaction pretreatment facility further comprises a mercury removal unit which is arranged on an upstream side of the adsorption vessel; and
wherein the method further comprises:
using the mercury removal unit to remove mercury contained in the hydrocarbon gas by bringing the hydrocarbon gas into contact with a mercury removal agent in which sulfur is supported on activated carbon.

7. A method of using a shipping terminal facility, comprising:
pretreating a hydrocarbon gas by using the method of using the liquefaction pretreatment facility for a hydrocarbon gas according to claim 1; and
using a liquefaction facility to liquefy the hydrocarbon gas treated in the liquefaction pretreatment facility.

8. The method of using a liquefaction pretreatment facility for a hydrocarbon gas according to claim 1, wherein 20 ppm by mole or more of the oxygen is supplied from the treatment gas line to the adsorption vessel.

9. The method of using a liquefaction pretreatment facility for a hydrocarbon gas according to claim 1, wherein after the water removal step, a content of water in the hydrocarbon gas coming out from an outlet of the adsorption vessel is 1 ppm by mole or less.

* * * * *